United States Patent
Leong et al.

(10) Patent No.: US 10,380,723 B2
(45) Date of Patent: Aug. 13, 2019

(54) EDITING DYNAMICALLY SELECTED PORTIONS OF TARGET IMAGES IN A MASK-BASED EDITING INTERFACE

(71) Applicant: Adobe Inc., San Jose, CA (US)

(72) Inventors: Betty M. Leong, Los Altos, CA (US); Alan L. Erickson, Highlands Ranch, CO (US); Sarah Stuckey, Petaluma, CA (US); Sarah Aye Kong, Cupertino, CA (US); Bradee R. Evans, Alameda, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/627,202

(22) Filed: Jun. 19, 2017

(65) Prior Publication Data
US 2018/0365813 A1    Dec. 20, 2018

(51) Int. Cl.
| | | |
|---|---|---|
| *G06T 5/00* | (2006.01) |
| *G06T 7/194* | (2017.01) |
| *G06T 11/60* | (2006.01) |
| *G06T 7/13* | (2017.01) |
| *G06T 5/50* | (2006.01) |
| *G06T 7/11* | (2017.01) |

(52) U.S. Cl.
CPC ............... *G06T 5/004* (2013.01); *G06T 5/50* (2013.01); *G06T 7/11* (2017.01); *G06T 7/13* (2017.01); *G06T 7/194* (2017.01); *G06T 11/60* (2013.01); *G06T 2207/10024* (2013.01); *G06T 2207/20016* (2013.01); *G06T 2207/20168* (2013.01); *G06T 2207/20192* (2013.01)

(58) Field of Classification Search
None
See application file for complete search history.

(56) References Cited

U.S. PATENT DOCUMENTS

| | | | | |
|---|---|---|---|---|
| 8,406,566 B1* | 3/2013 | Wilensky | ................ | G06T 11/60 382/173 |
| 2014/0071045 A1* | 3/2014 | Muchnick | ............... | G06T 11/60 345/156 |
| 2014/0355962 A1* | 12/2014 | Kim | ........................ | G06T 11/60 386/282 |

* cited by examiner

*Primary Examiner* — Kyle Zhai
(74) *Attorney, Agent, or Firm* — Kilpatrick Townsend & Stockton LLP

(57) ABSTRACT

In some embodiments, an image editing application stores, based on a first selection input, a selection state that identifies a first image portion of a target image as included in a preview image displayed in a mask-based editing interface of the image editing application. An edit to the preview image generated from the selected first image portion is applied in the mask-based editing interface. The image editing application also updates an edit state that tracks the edit applied to the preview image. The image editing application modifies, based on a second selection input received via the mask-based editing interface, the selection state to include a second image portion in the preview image. The edit state is maintained with the applied edit concurrently with modifying the selection state. The image editing application applies the edit to the modified preview image in the mask-based editing interface.

18 Claims, 12 Drawing Sheets

EDITING DYNAMICALLY SELECTED PORTIONS OF TARGET IMAGES IN A MASK-BASED EDITING INTERFACE

TECHNICAL FIELD

This disclosure relates generally to image editing applications that use masks to select and modify target images. More specifically, but not by way of limitation, this disclosure relates to editing dynamically selected portions of target images in a mask-based editing interface of an image editing application.

BACKGROUND

Image editing applications are used to enhance or otherwise modify images and other graphical content. For instance, an image editing application is used to select a portion of a target image, such as a person or other figure depicted in the image, and extract that image for compositing with a new background from a different image. Such a compositing operation often involves refining or matting the selected portion of the target image. Refining or matting includes modifying the edge of the selected image portion so that extraneous image content (e.g., additional background content around the depiction of a person) is removed.

In some existing image editing applications, a two-step process is used when selecting an image portion and matting (or otherwise refining) to create a high-quality selection (e.g., an image mask around the selected portion). For example, in the first step, the image editing application creates, in response to one or more user inputs, a binary selection with a quick-select or lasso tool. This binary selection triggers a modal dialog for refining the edge in the second step.

In a "refine edge" dialog, the image editing application constrains a user to edge-refinement tools. This constrained dialog prevents a user from accessing the selection tools (e.g., quick-select, lasso, etc.) to modify which portions of the target image are selected. This constraint requires users who wish to modify the selection to exit the "refine edge" dialog and then create an entirely new image selection. Exiting the "refine edge" dialog discards any edits made within the "refine edge" dialog.

These existing selection, refining, and editing processes in image editing applications may fail to provide intuitive workflows. For instance, in a typical image editing application, different previewing tools or visualizations are not available while creating the selection. Instead, those tools are provided only in the edge refinement/matting step. Furthermore, as noted above, modifying a selection requires a user to start over if mistakes are made with the original selection. For these and other reasons, existing image editing applications present disadvantages.

SUMMARY

Certain embodiments involve editing dynamically selected portions of target images in a mask-based editing interface. For example, an image editing application stores, based on a first selection input, a selection state that identifies a first image portion of a target image as included in a preview image displayed in a mask-based editing interface of the image editing application. An edit to the preview image generated from the selected first image portion is applied in the mask-based editing interface. The image editing application also updates an edit state that tracks the edit applied to the preview image. The image editing application modifies, based on a second selection input received via the mask-based editing interface, the selection state to include a second image portion in the preview image. The edit state is maintained with the applied edit concurrently with modifying the selection state. The image editing application applies the edit to the modified preview image in the mask-based editing interface.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
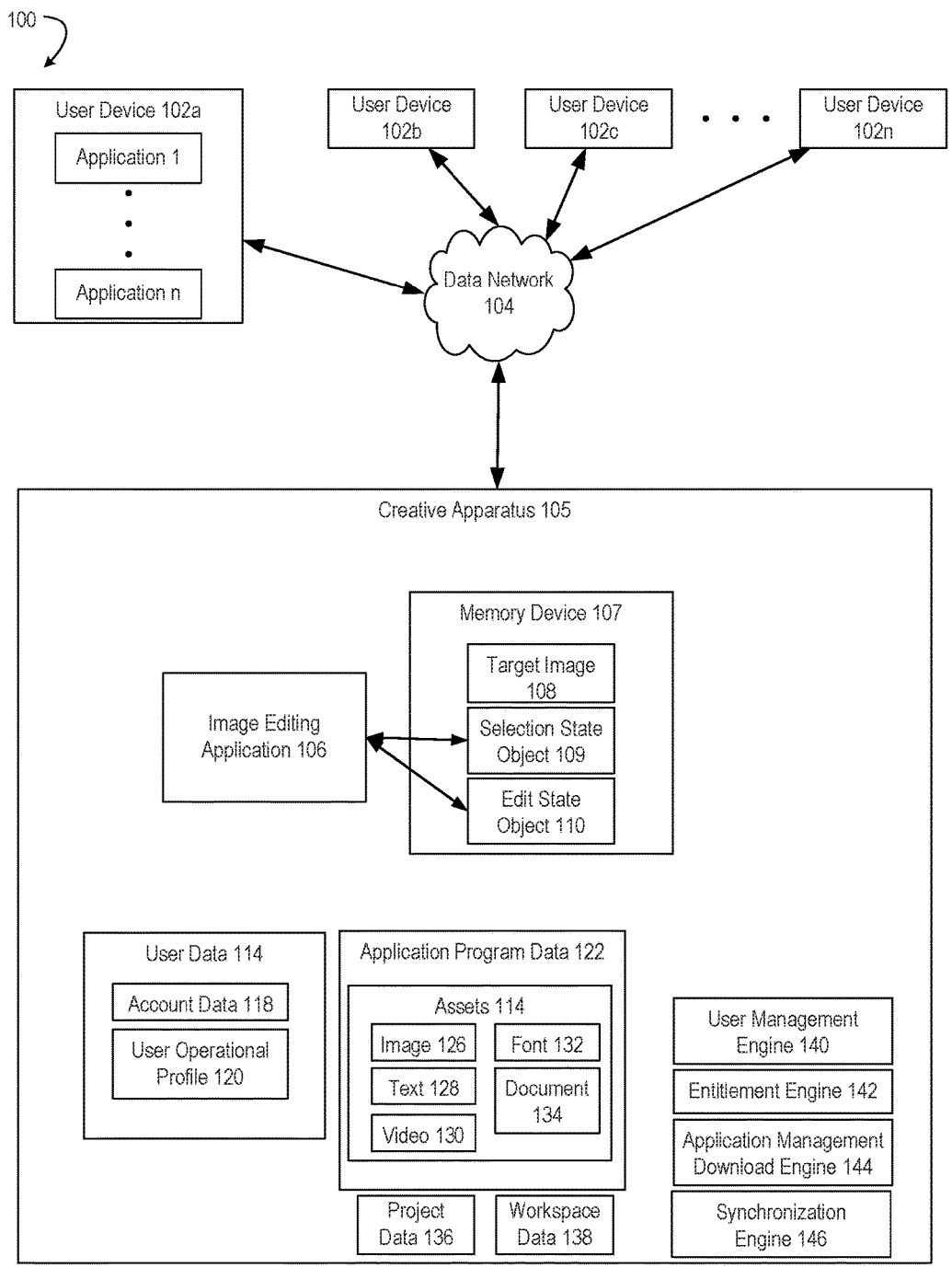
FIG. 1 depicts an example of a network environment for accessing and using an image editing application that provides a workflow for editing dynamically selected portions of target images in a mask-based editing interface, according to certain embodiments of the present disclosure.

Certain embodiments involve editing dynamically selected portions of target images in a mask-based editing interface. For example, an image editing application is used to select a portion of a target image, where a preview image is generated from the selected image portion. The image editing application enters a mask-based editing interface based on the selection. For instance, the mask-based editing interface includes one or more tools such as edge-refinement tools, compositing tools, and other editing tools. The image editing application separately and concurrently tracks the selection and one or more edits specified via the mask-based editing interface. Separately tracking the selection allows a user to modify the selection via the mask-based editing interface (e.g., by adding or removing image portions to or from the selection). In some embodiments, this state-tracking feature provides a more intuitive workflow as compared to existing solutions, since a user can modify a selection without having to discard any edits that have already been performed.

The follow non-limiting example is intended to introduce certain embodiments that involve using an image editing application to edit dynamically selected portions of target images. In this example, an image editing application is used to access a target image, such as a photograph depicting a person standing against a brick wall. To composite the depiction of the person with a new background, the image editing application selects the person from the target image in response to one or more selection inputs, such as a quick-select or lasso tool. The image editing application updates a selection state to reflect the received selection inputs. For instance, the updated selection state identifies the portion of the target image designated as the selected portion.

The selected image portion is displayed as part of a preview image in a mask-based editing interface of the image editing application. In this example, the image editing application generates a mask having boundaries corresponding to the selection input, where image content from the target image that is outside the mask's boundaries is rendered transparent in a preview provided by the mask-based editing interface. In the mask-based editing interface, one or more edits are applied to the preview image. An example of these edits involves refining the selection edge. The image editing application tracks these edits by updating an edit state used by the image editing application. Displaying the preview image involves accessing the selected image portion specified in the selection state and applying a mask generated from the edits specified in the edit state.

Concurrently tracking both the edit state and the selection state allows for modifying the selection without discarding edits. For instance, continuing with the example above, the image editing application receives one or more additional selection inputs via the mask-based editing interface. The additional selection inputs could be received due to the user deciding to enlarge or reduce the selection area (e.g., by adding hair or clothing of the depicted person that was inadvertently omitted from the original selection). The image editing application updates the selection state based on receiving the additional selection inputs. For instance, the image editing application can update the selection state to indicate that the hair or clothing has been added to the selection. The edit state is maintained concurrently with the selection state being updated. In some embodiments, one or more edits specified in the edit state are applied to the additional selection areas (e.g., by performing an edge-refinement operation along the added clothing region). For instance, if a certain edit operation is applicable to a given radius around a particular point, and an expanded selection falls within that radius, the image editing application automatically applies the edit to the expanded selection region. In this manner, the image editing application provides an intuitive workflow for editing a preview image while allowing dynamic selection of additional image region portions.

Example of an Operating Environment with an Image Editing Application for Editing Dynamically Selected Portions of Target Images in a Mask-Based Editing Interface Referring now to the drawings, FIG. 1 depicts an example of a network environment 100 for editing dynamically selected portions of target images in a mask-based editing interface. In the example depicted in FIG. 1, various user devices 102a-n access a creative apparatus 105 via one or more data networks 104. The creative apparatus 105 executes one or more image editing applications 106 (or other suitable program code) for performing one or more functions used in editing dynamically selected portions of target images in a mask-based editing interface.

In some embodiments, the image editing application 106 is used to perform mask-based editing of a target image 108 using both a selection state object 109 and an edit state object 110. The target image 108, the selection state object 109, and the edit state object 110 are stored in a memory device 107 that is included in or communicatively coupled to the creative apparatus 105. The image editing application 106 uses the selection state object 109 to track one or more portions of the target image 108 that have been selected via one or more user inputs. For instance, the selection state object 109 specifies or otherwise indicates the boundaries of an "unrefined" image mask. The image editing application 106 uses the edit state object 110 to track one or more edits to be applied to the target image 108 (e.g., edits specifying refinements to the image mask around the target image 108). For instance, the edit state object 110 specifies or otherwise indicates one or more edge-refinement operations to be applied to the boundaries of the "unrefined" image mask, which is indicated or specified by the selection state object 109. The image editing application 106 concurrently maintains the selection state object 109 and the edit state object 110, which allows the selection state to be modified without discarding edits that have been specified for the target image 108. Further examples of operations performed by the image editing application 106 are described in further detail with respect to FIGS. 2-11.

Some embodiments of the network environment 100 include user devices 102a-n. Examples of a user device include, but are not limited to, a personal computer, tablet computer, a desktop computer, a processing unit, any combination of these devices, or any other suitable device having one or more processors. Each user device includes at least one application supported by the creative apparatus 105. User devices 102a-n correspond to various users. Examples of the users include, but are not limited to, creative professionals or hobbyists who use creative tools to generate, edit, track, or manage creative content, marketing professionals who use marketing tools to generate, edit, track, or manage online content, or to manage online marking processes, end users, administrators, users who use image tools to create, edit, track, or manage images, advertisers, publishers, developers, content owners, content managers, content creators, content viewers, content consumers, designers, editors, any combination of these users, or any other user who uses digital tools to create, edit, track, or manage digital experiences.

Digital tools, as described herein, include tools such as the image editing application 106 that are used to perform a function or a workflow electronically. Examples of a digital tool include, but are not limited to, a creation tool, content editing tool, content publishing tool, content tracking tool, content managing tool, content printing tool, content consumption tool, any combination of these tools, or any other tool that can be used for creating, editing, managing, generating, tracking, consuming, or performing any other function or workflow related to content. Digital experience, as described herein, includes experience that can be consumed through an electronic device. Examples of the digital experience include content creating, content editing, content tracking, content publishing, content posting, content printing, content managing, content viewing, content consuming, any combination of these experiences, or any other workflow or function that can be performed related to content. Content, as described herein, includes electronic content. Examples of content include, but are not limited to, image, video, website, webpage, user interface, menu item, tool menu, magazine, slideshow, animation, social post, comment, blog, data feed, audio, advertisement, vector graphic, bitmap, document, any combination of one or more content, or any other electronic content.

Each of the user devices 102a-n is communicatively coupled to the creative apparatus 105 via one or more data networks 104. A user of a user device can use various products, applications, or services supported by the creative apparatus 105 via the data network 104. Examples of the data network 104 include, but are not limited to, the internet, a local area network, a wireless area network, a wired area network, a wide area network, and the like.

The creative apparatus 105 includes one or more engines for providing one or more digital experiences to the user. In some embodiments, these engines include one or more of the engines depicted in FIG. 1. In other embodiments, one or more of the engines depicted in FIG. 1 may be omitted from a creative apparatus 105.

The creative apparatus 105 can be implemented using one or more servers, one or more processing devices, one or more platforms with corresponding application programming interfaces, cloud infrastructure, or the like. In addition, each engine can also be implemented using one or more servers, one or more processing devices, one or more platforms with corresponding application programming interfaces, cloud infrastructure, or the like.

The creative apparatus 105 includes a data storage unit 112. The data storage unit 112 can be implemented as one or more databases or one or more data servers. The data storage unit 112 includes data that is used by the image editing application 106.

The user uses one or more application programs, which can include the image editing application 106, to create one or more projects or assets. In addition, the user also has a workspace within each application program. The workspace, as described herein, includes setting of the application program, setting of tools or setting of user interface provided by the application program, and any other setting or properties specific to the application program. Each user has a workspace. The workspace, the projects, or the assets are stored as application program data 120 in the data storage unit 112 by a synchronization engine 140. The application program data 120 can be specific to the user or can be shared with other users based on rights management.

In some embodiments, the application program data 120 includes one or more assets 122. The assets 122 may include shared assets that the user wants to share with other users or that the user wants to offer on a marketplace. The assets 122 can also be shared across multiple application programs (e.g., the image editing application 108). In some embodiments, each asset 122 includes metadata.

In some embodiments, each asset 122 also includes a file. Examples of the file include, but are not limited to, an image 124, a graphic 126, a video 128, a combination of any of these, and the like. In another embodiment, an asset only includes the metadata. The application program data 120 also includes project data 130 and workspace data 132. In some embodiments, the project data 130 includes copies of the assets 122 or the assets 122 themselves. In additional or alternative embodiments, the assets 122 are standalone assets. Similarly, the workspace data 132 can be part of the project data 130 in some embodiments and may be standalone data in other embodiments.

In some embodiments, the user can have one or more user devices (e.g., user devices 102a-n). The application program data 120 is accessible by the user from any device (e.g., user device 102b), including a device that was not used to create the assets 122 (e.g., user device 102c). This is achieved by the synchronization engine 140 that stores the application program data 120 in the data storage unit 112 and makes the application program data 120 available for access by the user or other users via any device. Before accessing the application program data 120 by the user from any other device or by any other user, the user or the other user may need to provide login details for authentication if not already logged in. Otherwise, if the user or the other user is logged in, then a newly created asset or updates to the application program data 120 are provided in real time. The workspace data 132 enables the synchronization engine 140 to provide same workspace configuration to the user on any other device or to the other user based on rights management data.

In some embodiments, a user of one or more of the user devices 102a-n visits a webpage or an application store to explore applications supported by the creative apparatus 105 (e.g., the image editing application 106). The creative apparatus 105 provides the applications (e.g., the image editing application 106) as a software as a service ("SaaS"), or as a standalone application that can be installed on the user device 102, or as a combination.

In some embodiments, the user creates an account with the creative apparatus 105 by providing user details and by creating login details. Alternatively, the creative apparatus 105 can automatically create login details for the user in response to receipt of the user details. In some embodiments, the user is also prompted to install an application manager. The application manager enables the user to manage installation of various applications supported by the creative apparatus 105 and to manage other functionalities, such as updates, subscription account and the like, associated with the applications. The user details are received by a user management engine 134 and stored as user data 114 in the data storage unit 112. In some embodiments, the user data 114 further includes account data 116 under which the user details are stored.

In some embodiments, the user either can opt for a trial account or can make payment based on the type of account or subscription chosen by the user. Alternatively, the payment can be based on product or number of products chosen by the user. In some embodiments, based on payment details of the user, a user operational profile 118 is generated by an entitlement engine 136. The user operational profile 118 is stored in the data storage unit 112 and indicates entitlement of the user to various products or services. In some embodiments, the user operational profile 118 also indicates type of user, i.e. free, trial, student, discounted, or paid. In some embodiments, the user management engine 134 and the entitlement engine 136 can be one single engine performing the functionalities of both the engines.

In some embodiments, the user installs various applications supported by the creative apparatus 105 via an application download management engine 138. Application installers or application programs (which may include the image editing application 106 or other software usable to perform operations described herein) are present in the data storage unit 112 and are fetched by the application download management engine 138. These applications are made available to the user directly or via the application manager. In some embodiments, all application programs are fetched and provided to the user via an interface of the application download management engine 138. In other embodiments, application programs for which the user is eligible based on user's operational profile are displayed to the user. The user selects the application programs that the user wants to download. The application programs are downloaded on one or more of the user devices 102a-n by the application manager via the application download management engine 138. Corresponding data regarding the download is also updated in the user operational profile 118. The application download management engine 138 also manages a process of providing updates to the user device 102.

In some embodiments, upon download, installation, and launching of an application program, the user is asked to provide the login details. A check is again made by the user management engine 134 and the entitlement engine 136 to ensure that the user is entitled to use the application program. In other embodiments, direct access is provided to the application program as the user is already logged into the application manager.

Figure 2:
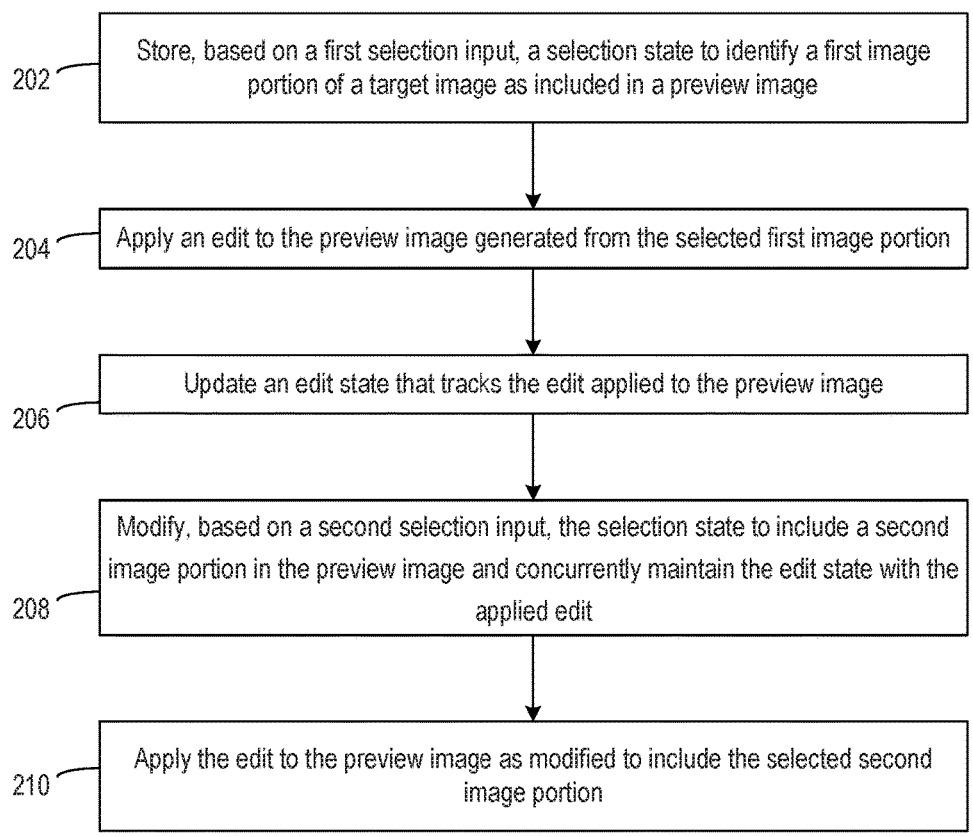
FIG. 2 depicts an example of a process for facilitating the editing of dynamically selected portions of target images in a mask-based editing interface of an image editing application, according to certain embodiments of the present disclosure.

Examples of Editing Dynamically Selected Portions of Target Images in a Mask-Based Editing Interface of an Image Editing Application As described in detail with respect to the various examples below, the image editing application 106 is used for editing dynamically selected portions of target images in a mask-based editing interface of an image editing application. For instance, FIG. 2 depicts an example of a process 200, which may be performed by the creative apparatus 105 or another suitable computing system, that facilitates the editing of dynamically selected portions of target images in a mask-based editing interface. In some embodiments, one or more processing devices implement operations depicted in FIG. 2 by executing suitable program code (e.g., the image editing application 106). For illustrative purposes, the process 200 is described with reference to certain examples depicted in the figures. Other implementations, however, are possible.

At block 202, the process 200 involves storing, based on a first selection input, a selection state to identify a first image portion of a target image as included in a preview image. One or more processing devices execute the image editing application 106 (or suitable other program code) to implement block 202. The selection state identifies a portion of the target image that is being used as a preview image in a mask-based editing interface for editing one or more portions of the target image. The image editing application 106 accesses or generates a selection state object 109 stored in a non-transitory computer-readable medium that includes data identifying the state of the selection. For example, in a matting operation in which a mask is applied to a target image and then refined, the selection state object 109 can identify an unrefined mask. As described further below, the image editing application 106 maintains the selection state object 109 (e.g., keeps the unrefined mask intact) while various edge-refinement operations are performed (e.g., modifying an edge radius, applying a refinement brush stroke etc.) and applied on top of the selected image portion in the selection state object 109 (e.g., the unrefined mask).

Figure 3:
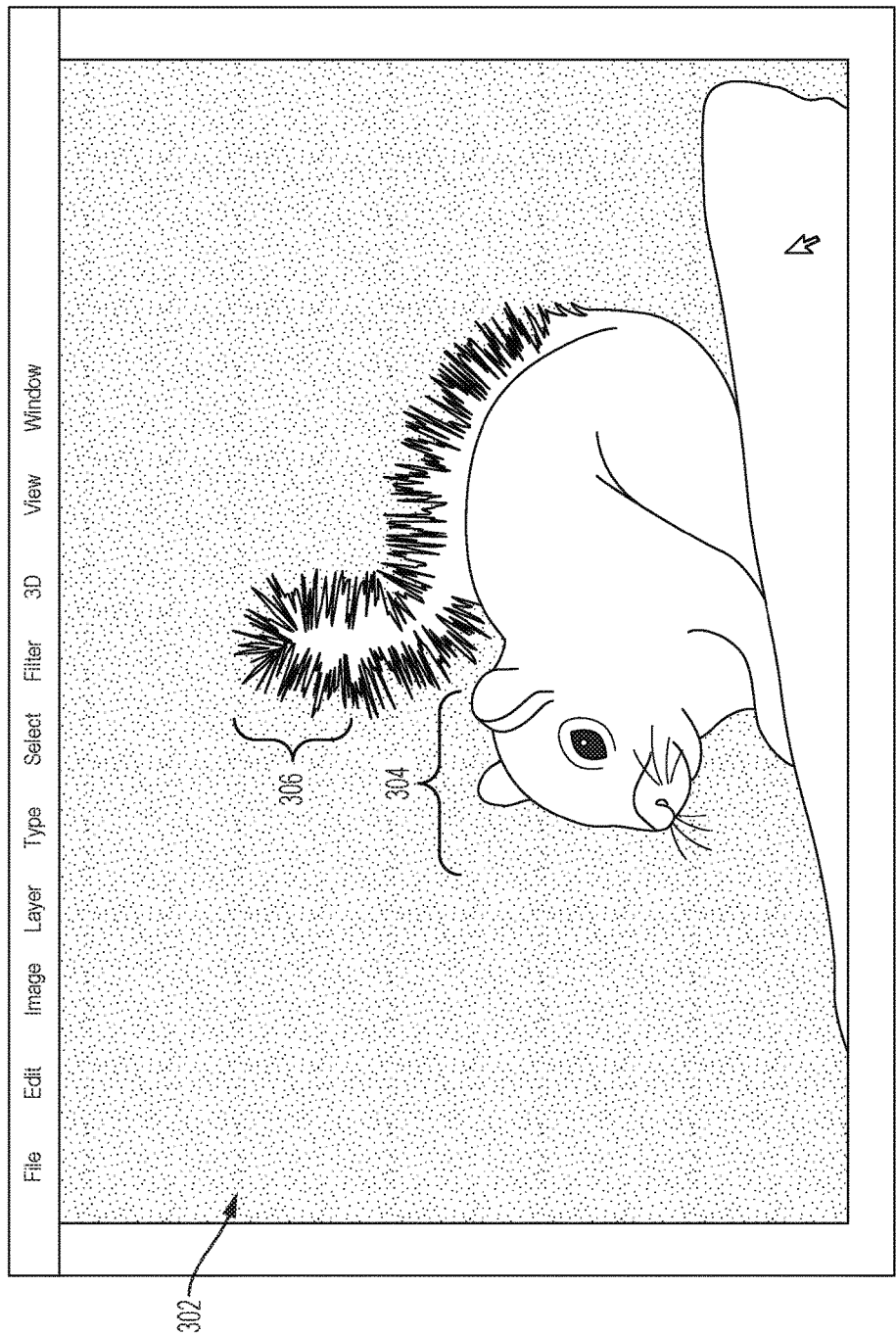
FIG. 3 depicts an example of an interface in an image editing application for selecting one or more image portions from a target image, according to certain embodiments of the present disclosure.
Figure 4:
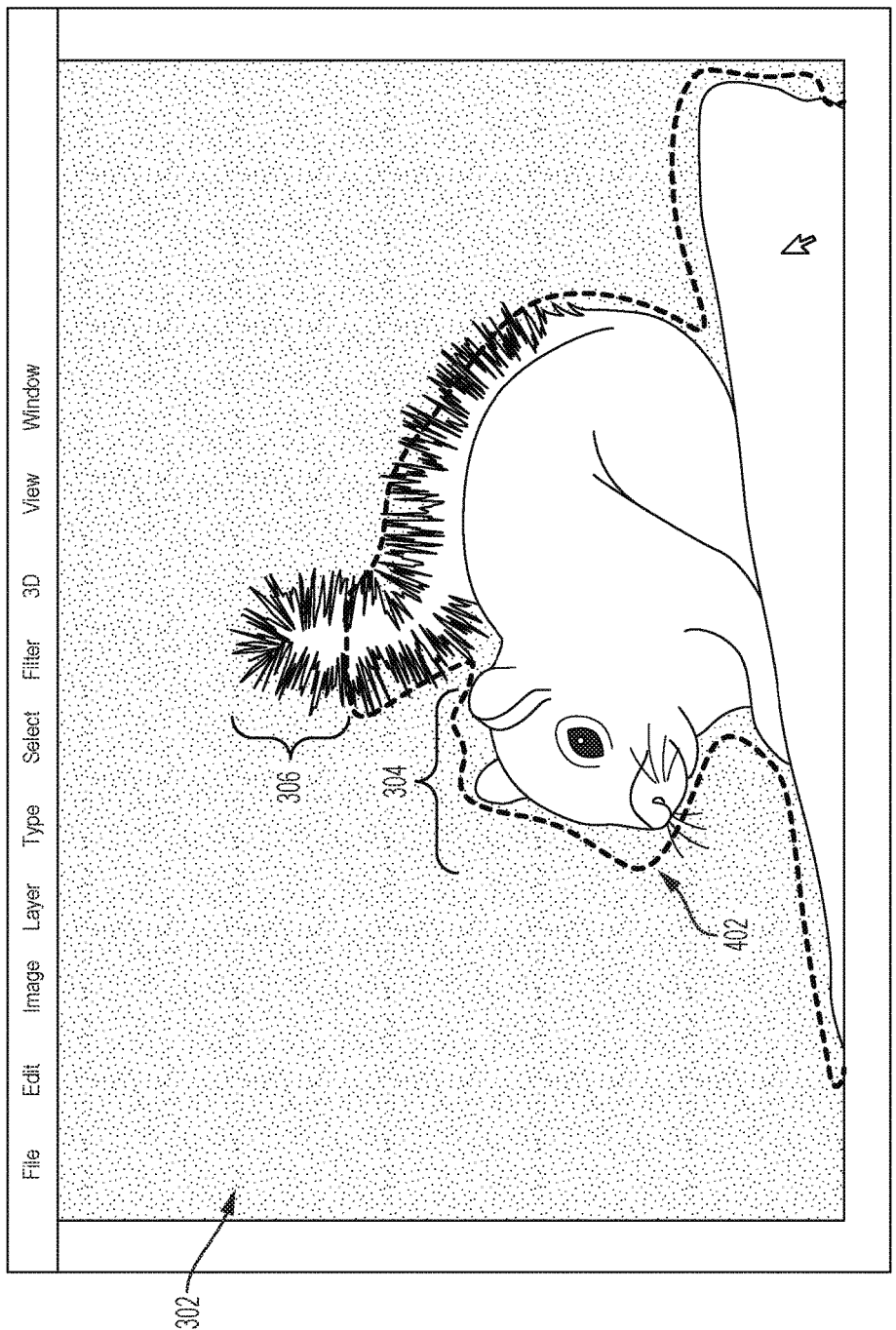
FIG. 4 depicts an example of selecting an image portion from the target image depicted in FIG. 3 for use as a preview image in a mask-based editing interface, according to certain embodiments of the present disclosure.

Implementing block 202 involves accessing a target image, displaying the target image in an interface of the image editing application 106, and providing one or more selection tools (e.g., a "Quick Select" tool, a "lasso" tool, etc.) in the interface for causing the image editing application 106 to select one or more image portions from the target image. FIG. 3 depicts an example of an interface 300 in an image editing application 106, which is used for selecting one or more image portions from a target image 302. The target image 302 depicted in FIG. 3 includes, for example, image portions 304 and 306. FIG. 4 depicts an example of selecting part of the target image 302, including the image portion 304, for use as a preview image in a mask-based editing interface. In this example, the image editing application 106 receives a selection input 402 that outlines part of the target image 302 (i.e., some of the depicted squirrel and the stone on which the squirrel stands), while excluding other portions of the target image 302 (i.e., the solid-color background and the image portion 306 that includes the top of the squirrel's tail). (Although the examples described herein refer to a target image 302, which can be an image 124, the embodiments described can be applied to a graphic 126 or one or more stills from a video 128.)

The image editing application 106 accesses the target image 302 that is stored in a non-transitory computer-readable medium. For example, the creative apparatus 105 retrieves the target image from a data storage unit 112 (or other memory device) to which a temporary version of the target image has been stored after the creative apparatus 105 has received the target image from a user device 102. Additionally or alternatively, accessing the target image may include a user device 102 retrieving the target image from a memory device to which the user device has stored the target image after downloading the target image (e.g., from a digital camera connected to the user device 102). In some embodiments, accessing the target image involves communicating, via a data bus, suitable signals between a local non-transitory computer-readable medium and the processing device. In additional or alternative embodiments, accessing the target image involves communicating, via a data network, suitable signals between a computing system that includes the non-transitory computer-readable medium and a computing system that includes the processing device.

Figure 5:
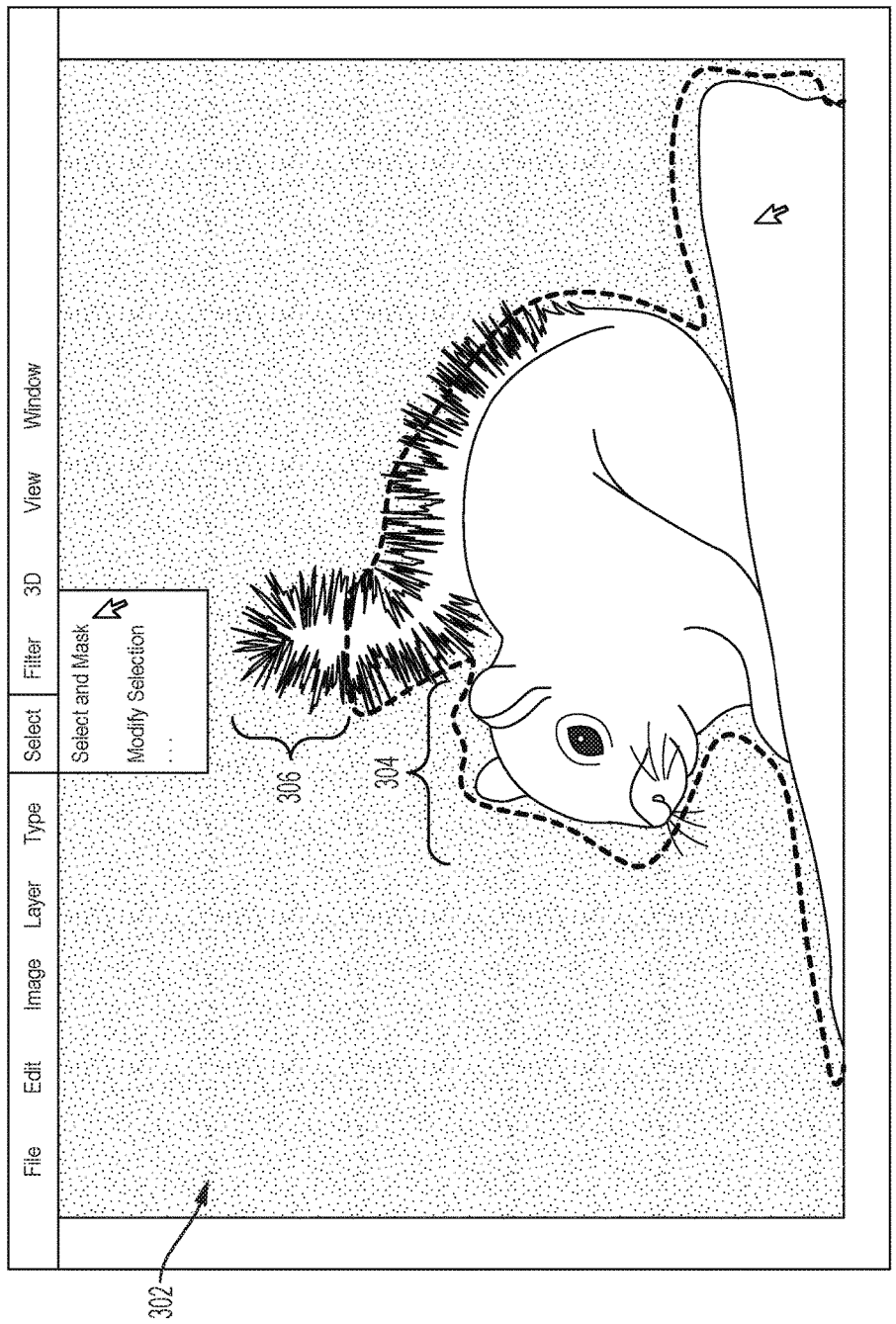
FIG. 5 depicts an example of activating the mask-based editing interface for the selected image portion depicted in FIG. 4, according to certain embodiments of the present disclosure.
Figure 6:
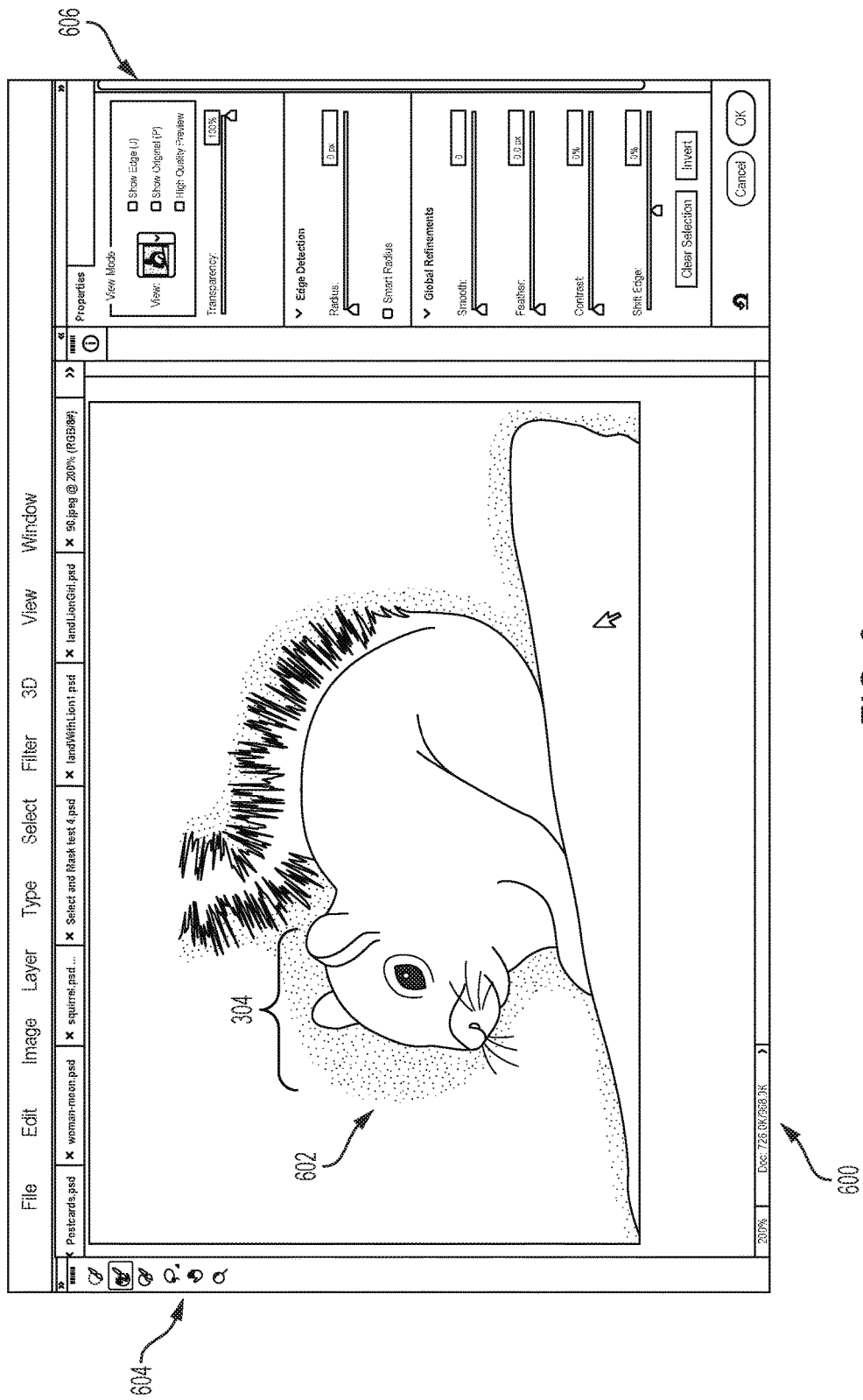
FIG. 6 depicts an example of the mask-based editing interface displaying a preview image generated from the selected image portion depicted in FIG. 4, according to certain embodiments of the present disclosure.

The image editing application 106 provides a mask-based editing interface for using configurable masks to edit one or more portions of the target image (e.g., refining the edge of the selected image portion, compositing the selected image portion with one or more additional images, etc.). For instance, continuing with the example above, FIG. 5 depicts activating a mask-based editing interface for the selected image portion. As depicted in FIG. 5, the image editing application 106 receives a "Select and Mask" command via one or more user interactions (i.e., accessing the "Select and Mask" command from the "Select" menu) in the interface 300. In response to receiving the "Select and Mask" command, the image editing application 106 activates a mask-based editing interface 600, an example of which is depicted in FIG. 6.

The mask-based editing interface 600 provides a workspace on the application canvas of the image editing application 106. For instance, the mask-based editing interface 600 is generated by the image editing application 106 entering a semi-modal configuration, where the semi-modal configuration allows for creating high-quality selections or masks on a preview image 602. The preview image 602 is generated from the selection of one or more image portions from the target image 302. The workspace provided by the mask-based editing interface 600 includes a refinement palette 604 with selection tools (e.g., a "Quick Selection," tool, a "Lasso and Brush" tool, etc.) as well as one or more edge-refinement tools (e.g. a "Refine Edge Brush" tool). In some embodiments, the mask-based editing interface 600 provides a user with the ability to visualize the result of various selection, masking, and other editing operations in different viewing modes, which are accessible via the tool palette 606. The tool palette 606 includes various selectable options and commands that configure the image editing application to visually indicate the quality of a selection or mask against various background images (e.g., in a compositing operation).

Returning to FIG. 2, the process 200 also involves applying an edit to the preview image generated from the selected first image portion, as depicted at block 204. One or more processing devices execute the image editing application 106 or other program code to implement block 204. In some embodiments, applying the edit to a preview image involves editing an image mask associated with the preview image, which causes a change in a display of the preview image by masking out different portions of the preview image (e.g., causing certain masked portions of the image to be transparent). In other embodiments, applying the edit to the preview image involves modifying the preview image itself.

Figure 7:
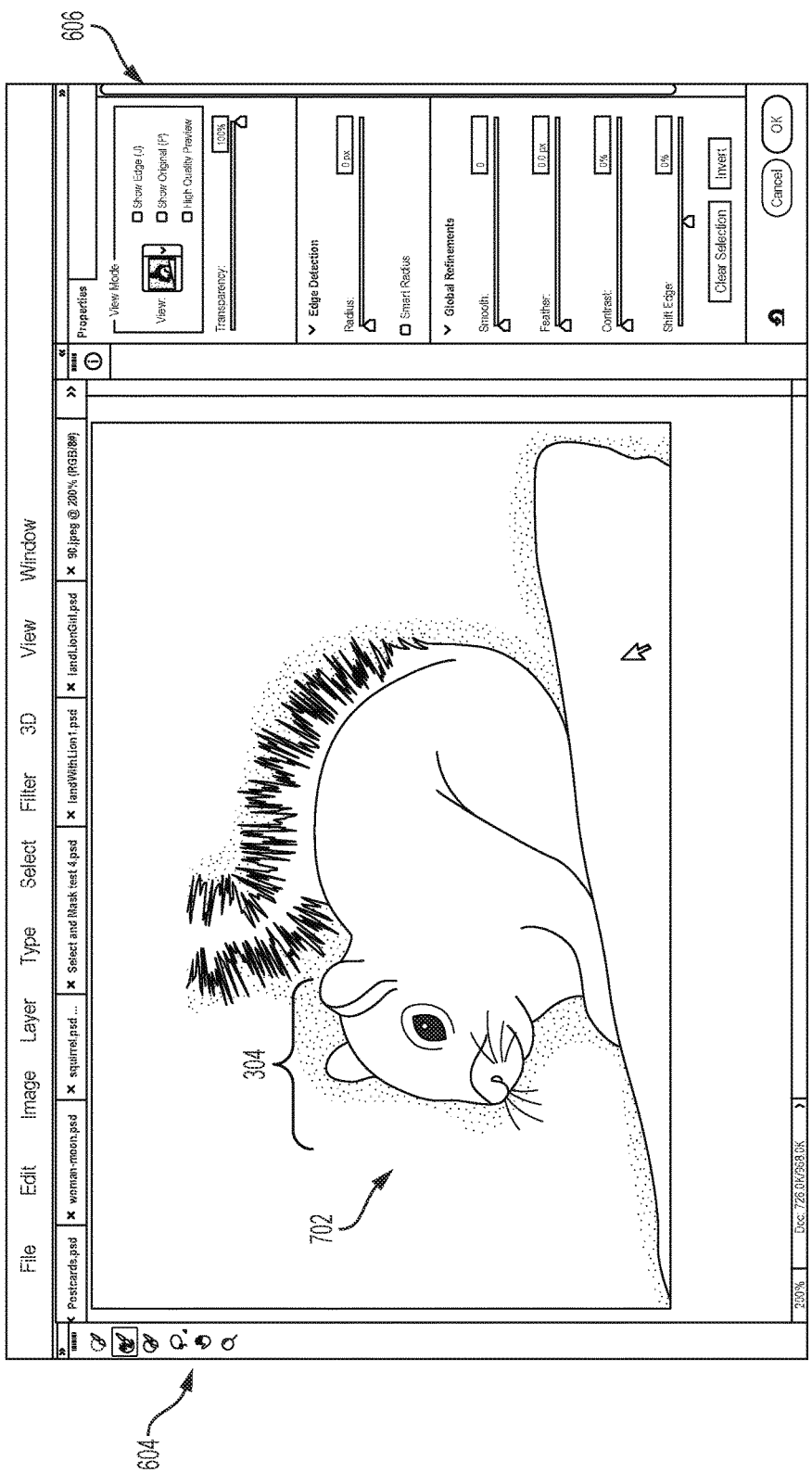
FIG. 7 depicts an example of refining an edge of the preview image via the mask-based editing interface depicted in FIG. 6, according to certain embodiments of the present disclosure.

In some embodiments, the edit is an edge-refinement operation. For instance, continuing with the examples above, FIG. 7 depicts an example of refining an edge of the preview image via the mask-based editing interface 600. In this example, the image editing application 106 generates an updated preview image 702 responsive to an edit command, such as a command corresponding to a user interaction with a "Refine Edge Brush" tool from the refinement palette 604. The image editing application generates the updated preview image 702, which involves refining an edge of the selected image portion 304.

In some embodiments, the mask-based editing interface 600 provides real-time visual feedback regarding the effect of an edit, such as an edge-refinement edit in a matting operation. For instance, the image editing application 106 updates the mask-based editing interface 600 to preview the refined area of the image portion 304 concurrently with a "mouse down" or other similar input. In these embodiments, the edge-refinement (or another suitable edit) involves receiving an edit command, such as a "brush" input using the "Refine Edge Brush" tool from the refinement palette 604. One example of the edit command is a dragging command that includes a start input (e.g., a mouse-down event such as a click-and-hold, a placement of a finger or stylus on a touch screen, etc.). The dragging command also includes a movement input subsequent to the start input (e.g., a movement of the mouse during the click-and-hold, a movement of the finger or stylus while placed on the touch screen, etc.). The dragging command also includes a completion input subsequent to the movement input (e.g., releasing the mouse button, removing the finger or stylus from the touch screen, etc.). Another example of the edit command is a slider command that includes a start input (e.g., a selection of a slider or other command invoking a slider function). The slider command also includes a movement input subsequent to the start input (e.g., a movement of the slider, etc.). The slider command also includes a completion input subsequent to the movement input (e.g., releasing the mouse button or some other input indicating that the slider operation has been completed).

In these embodiments, the image editing application 106 updates a display of the preview image to include the edit during the movement input. For instance, in the example depicted in FIG. 7, the preview image 702 can be incrementally updated with a new edge in the image portion 304 concurrently with the "Refine Edge Brush" tool being moved along a path at the edge of the image portion 304. The concurrent update can occur simultaneously or near-simultaneously with the movement, such that a given part of the path is updated immediately after the "Refine Edge Brush" tool is moved to a new position.

In some embodiments, the image editing application 106 implements one or more optimizations that conserve processing resources, memory resources, or both when providing live feedback with respect to edge refinements or other edits. For instance, the image editing application 106 generates the preview image depicted in the mask-based editing interface 600 by creating a lower-resolution version of the selected image portion of the target image 302 (e.g., creating a lower-resolution version of entire target image 302 including the selected image portion, creating a lower-resolution version of the selected image portion only, etc.). The low-resolution version of the selected image portion can be visually indistinguishable from the target image 302 at the original resolution, at least at the zoom level used for the preview image in the mask-based editing interface 600. To implement block 204, the image editing application updates the display of the preview image by editing and displaying the lower-resolution version. For instance, if the edge-refinement or another edit involves a dragging command, the image editing application 106 modifies the low-resolution preview image concurrently with the movement input.

At block 206, the process 200 involves updating an edit state that tracks the edit applied to the preview image. One or more processing devices execute the image editing application 106 or other program code to implement block 206. The image editing application 106 accesses or generates an edit state object 110 stored in a non-transitory computer-readable medium that includes data identifying one or more parameters of an edit operation, such as an edge-refinement operation. For example, in a matting operation in which a mask is applied to a target image and then refined, the edit state object 110 can include data identifying various parameters of the edit operations. Examples of these parameters include an edit type (e.g., a "Refine Edge Brush" identifier), an applicable area for the edit type (e.g., a radius in which the "Refine Edge Brush" tool operates, a path of the "Refine Edge Brush" tool indicated by one or more user inputs, etc.), an edge radius for a refined edge, etc. In some embodiments, to update the preview image depicted in the mask-based editing interface 600, the image editing application 106 applies the edit operations with the edit with the specified parameters on top of a mask indicated by data from the selection state object 109 (e.g., the unrefined mask).

Figure 8:
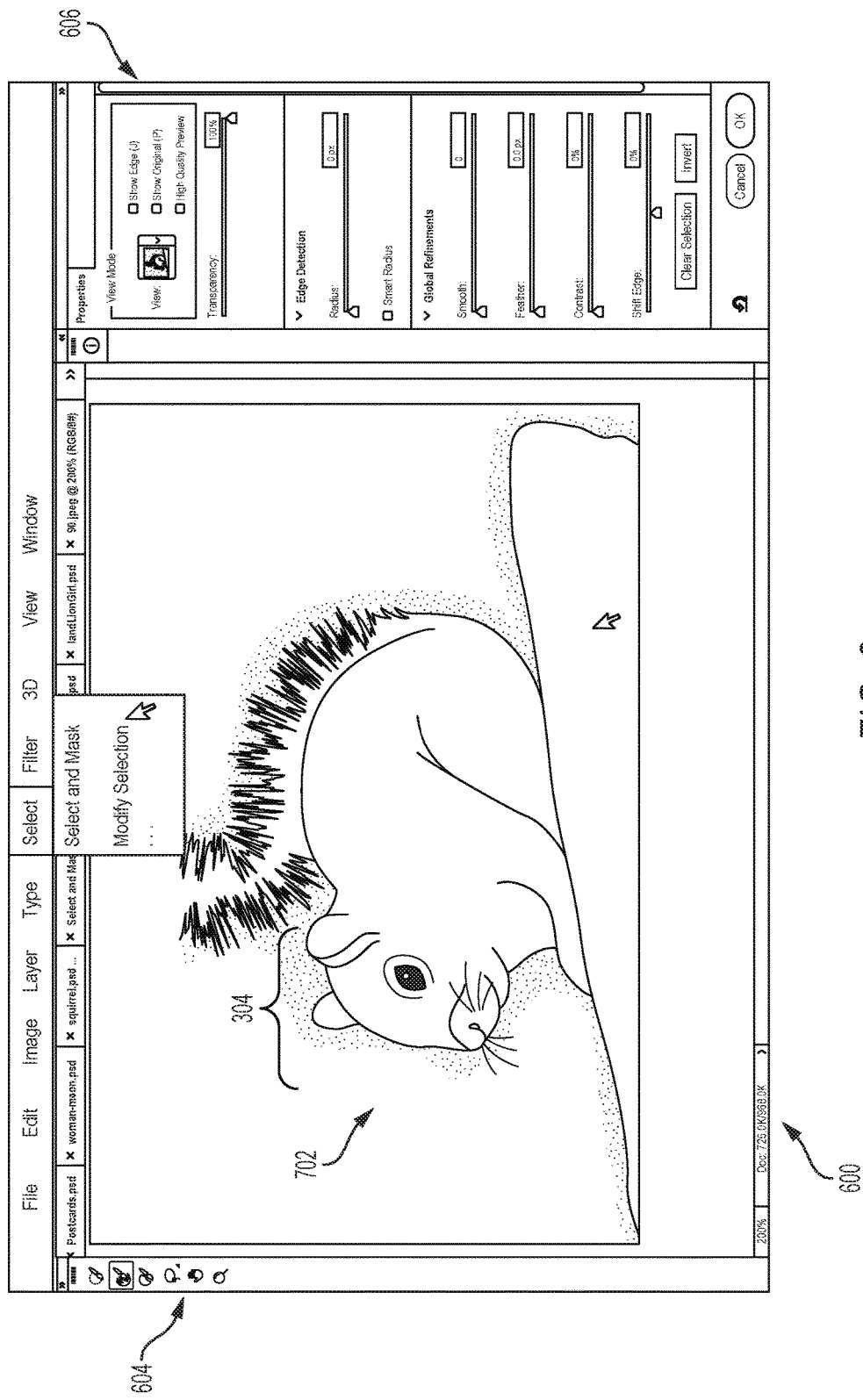
FIG. 8 depicts an example of activating a selection-modification command in the mask-based editing interface, according to certain embodiments of the present disclosure.

At block 208, the process 200 involves modifying, based on a second selection input, the selection state to include a second image portion in the preview image and concurrently maintain the edit state with the applied edit. One or more processing devices execute the image editing application 106 or other program code to implement block 208. For instance, in the example depicted in FIGS. 4-7, the selected portion of the target image 302 includes an image portion 304 depicting the squirrel's head, but omits the image portion 306 depicting the top of the squirrel's tail. The image editing application 106 modifies the selection state responsive to receiving one or more selection inputs via the mask-based editing interface 600. In a simplified example, as depicted in FIG. 8, the image editing application 106 can receive a "Modify Selection" command via a menu displayed in the mask-based editing interface 600, which allows the user to modify the shape of the selection input depicted in FIG. 4. But other implementations are possible. For instance, in additional or alternative embodiments, the image editing application 106 can receive a suitable command corresponding to user interaction with one or more select tools (e.g., a "Quick Select" tool, a "lasso" tool, a "polygonal lasso" tool) available via the refinement palette 604. The use of these select tools, instead of or in addition to the "Modify Selection" example depicted in FIG. 8, allow a user to invoke a selection-modification command.

In this example, the second selection input indicates that the image portion 306 (i.e., the top of the squirrel tail) should be added to the selected portion of the target image 302. The image editing application 106 responds to receiving this second selection input by modifying the selection state object to indicate the image portion 306. The image editing application 106 updates the preview image to reflect this change in the selections state object. For instance, as depicted in FIG. 9, the updated preview image 902 (e.g., a low-resolution version of the select target image portion) includes both image portions 304 and 306.

Figure 9:
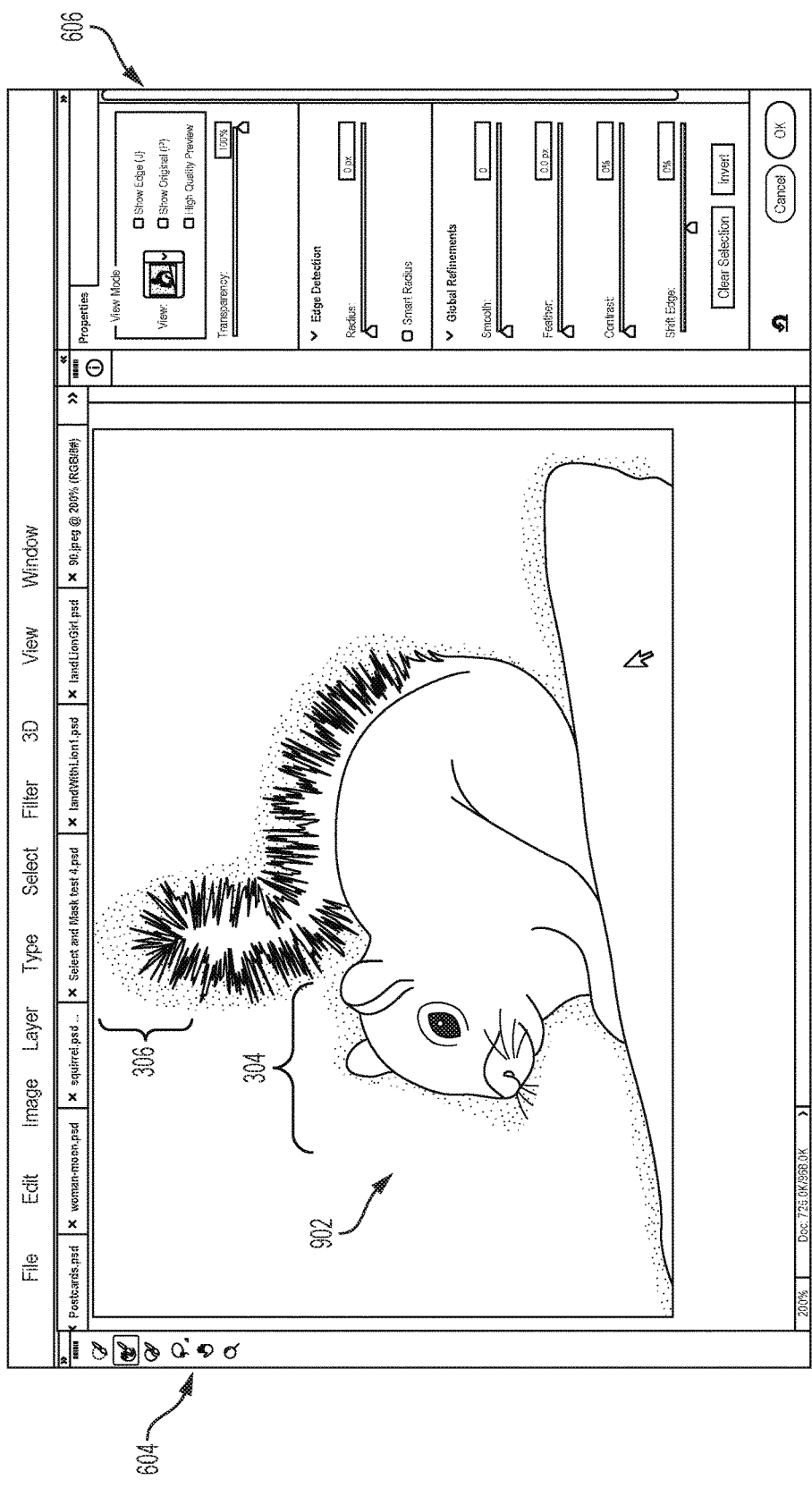
FIG. 9 depicts an example of a modified selection from the target image being used to update the preview image in the mask-based editing interface, according to certain embodiments of the present disclosure.

As indicated in FIG. 9, the image editing application 106 maintains the edit state with the applied edit concurrently with updated the selection state. For instance, the update preview image 902 still includes the refined edge along the image portion 304 even though the selection has been updated to include the image portion 306, rather than reverting to the unrefined edge depicted in FIG. 6.

Figure 10:
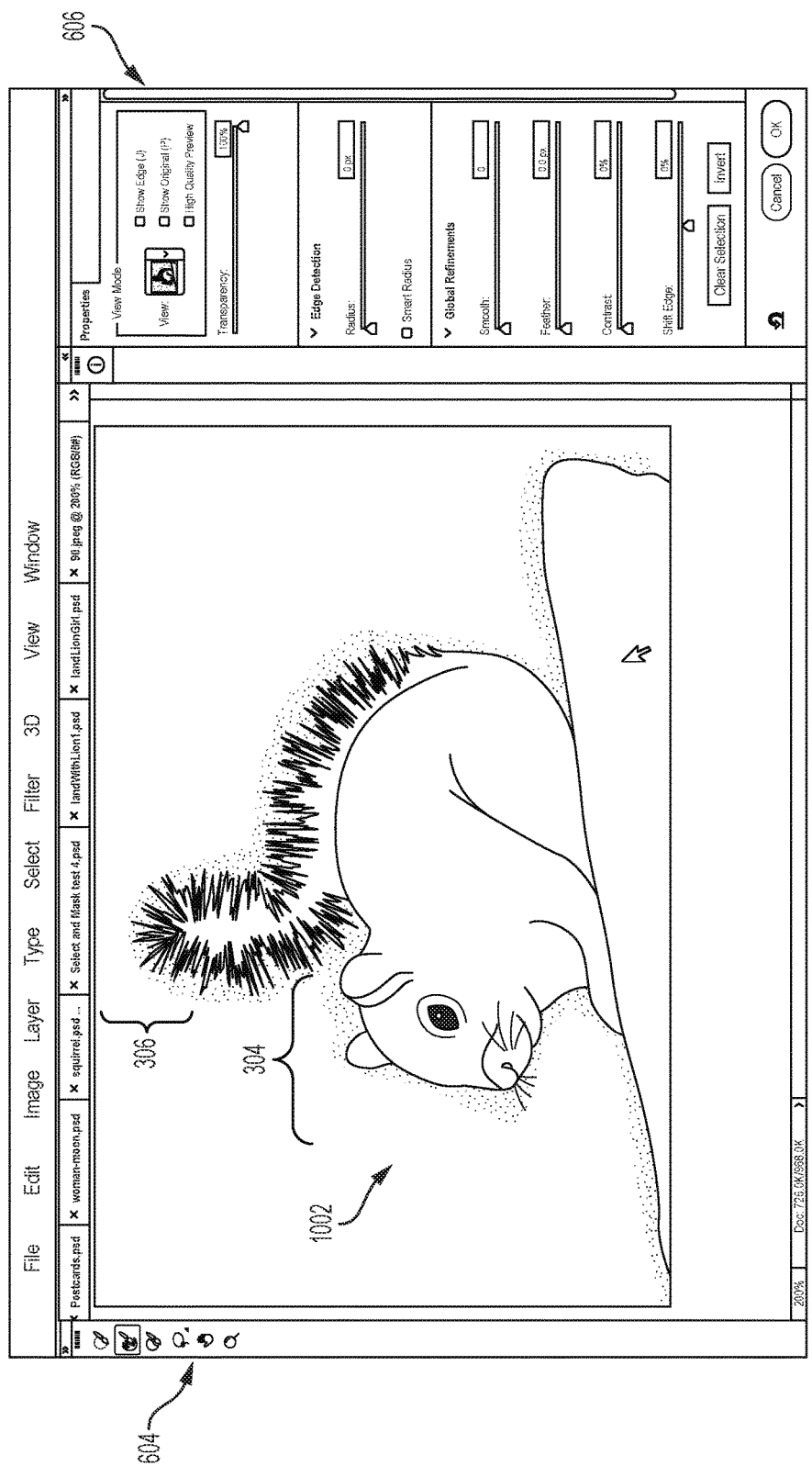
FIG. 10 depicts an example of refining an edge of the updated preview image, according to certain embodiments of the present disclosure.

At block 210, the process 200 involves applying, by the image editing application and in the preview interface, one or more edits to the preview image that has been modified to include the selected second image portion. One or more processing devices execute the image editing application 106 or other program code to implement block 210. For instance, FIG. 10 depicts an example in which the image editing application 106 applies additional edge-refinement operations to the preview image, thereby creating an updated preview image 1002 in which edges along both of the image portions 304 and 306 have been refined (e.g., by omitting more of the solid color background surrounding the squirrel's head and tail).

The selection state object 109 for tracking the selection state and the edit state object 110 for tracking the edit state can be implemented in any suitable manner. For instance, the selection state object 109 can store, specify, identify, or otherwise indicate a first, "unrefined" image mask. The selection inputs described above cause the image editing application 106 to define the boundaries of the unrefined image mask. The selection state object 109 includes data defining the boundaries of the unrefined image mask. The edit state object 110 can store, specify, identify, or otherwise indicate data describing one or more edits that modify the unrefined image mask. To display the preview image, the image editing application creates a dynamic image mask (i.e., a "refined" image mask) by creating a copy of the unrefined image mask stored in the selection state object 109 and modifying the copy of the unrefined image mask in accordance with the edits identified in the edit state object 110. Modifying the copy of the unrefined image mask creates a dynamic, refined image mask having different boundaries. The image editing application 106 causes portions of the target image (i.e., the corresponding preview image) within the boundaries of the refined image mask to be visible in the mask-based editing interface 600. The image editing application 106 also causes other portions of the target image outside the boundaries of the refined image mask to be transparent in the mask-based editing interface.

In some embodiments, concurrently maintaining both the selection state and the edit state allow edits that have been previously applied to a first selected image portion to be applied to a second selected image portion that is added by updating the selection. For instance, the edit state can include both an edit type for the edit and a radius around an image mask associated with the preview image, a radius around the preview image (or a portion thereof), or some other radius associated with the preview image and used to specify where the edit should be applied. The radius indicates an applicable area for the edit. The edit is applied to a first image portion. For example, the edit can be an edge-refinement operation that is applied to a first image portion depicting the middle of the squirrel's tail. The selection of the target image can then be updated to include a second image portion depicting the top of the squirrel's tail. The image editing application 106 determines that the second image portion is within the applicable area of the previously applied edit (e.g., within a radius of a "refine edge" brushstroke). Based on this determination, the image editing application 106 modifies the selected second image portion in the preview image in accordance with the edit type. For instance, if a "refine edge" brushstroke has been applied to a current selection that includes the middle of the squirrel's tail and the current selection is then updated to include the top of the squirrel's tail, the edge of the image portion including the top of the squirrel's tail is likewise refined if the applicable area of the "refine edge" brushstroke encompasses the top of the squirrel's tail.

In some embodiments, the preview depicted in the mask-based editing interface 600 can be adjusted to allow a user to more easily determine if additional portions of the target image should be selected. For instance, in FIG. 11, the "transparency" option in palette 606 has been modified via a transparency-reducing input (e.g., the movement of the "transparency" slide in the mask-based editing interface 600). In response to receiving this transparency-reducing input, the image editing application 106 decreases a degree of transparency for the other portions of the target image outside the refined image mask. Decreasing the degree of transparency causes the portions of the target image outside the refined image mask to be visible in the mask-based editing interface.

Figure 11:
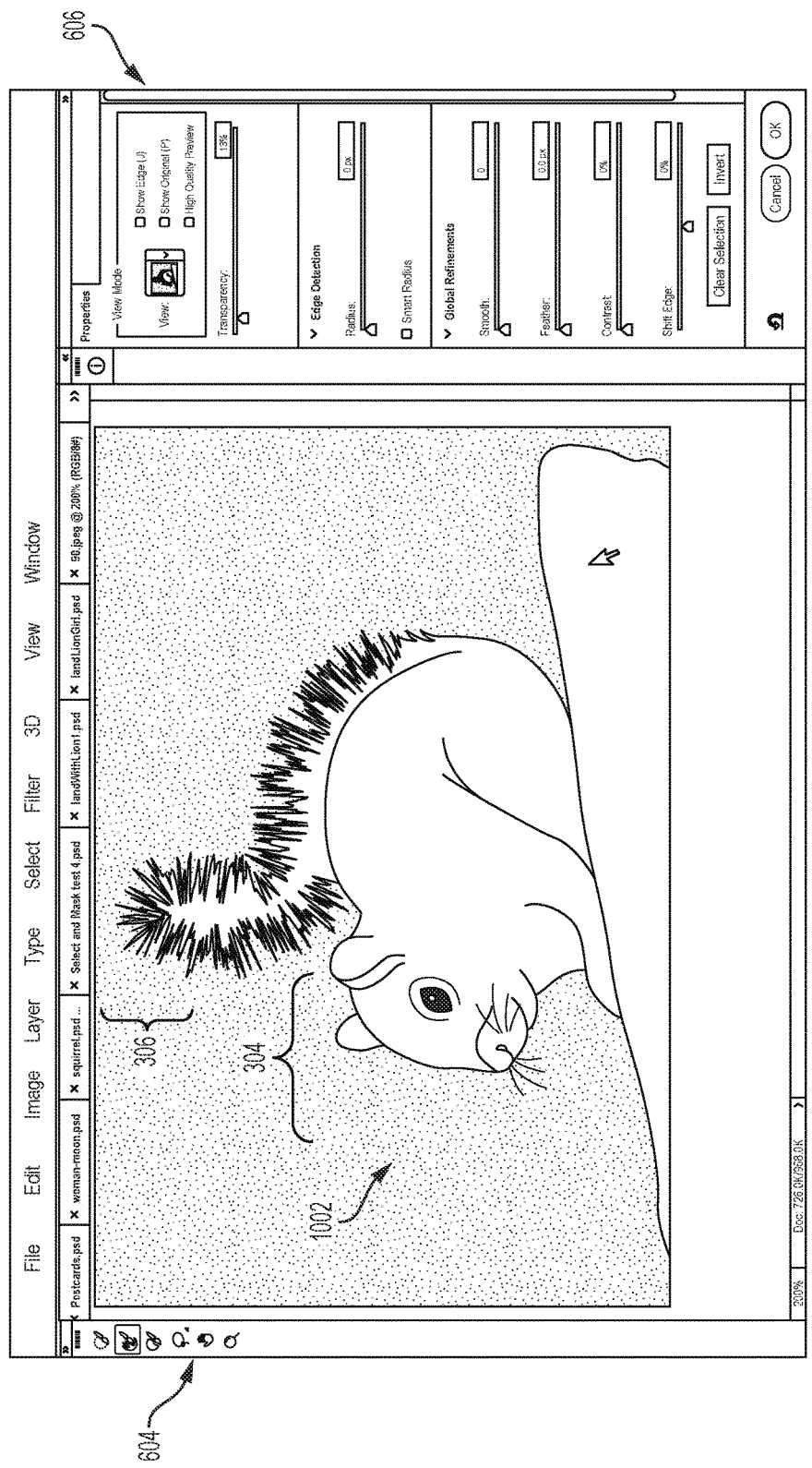
FIG. 11 depicts an example in which a transparency of an image mask has been increased in a mask-based editing interface to allow a selection to be refined, according to certain embodiments of the present disclosure.

For instance, in the examples depicted in FIGS. 6 and 7, the refined image mask has boundaries that cause the image portion 306 (i.e., the top of the squirrel tail) to be transparent in the mask-based editing interface 600. Decreasing the transparency of the image portions outside the mask, as depicted in FIG. 11, can allow a user to determine that the top of the squirrel's tail should be included in the selection (e.g., by "fading in" the unselected portions of the target image 302). While the decreased degree of transparency is present, the image editing application 106 image editing application 106 can receive the second selection input, described above with respect to block 208, that causes the image portion 306 to be included in the preview image. The image editing application updates the refined image mask (e.g., by applying the edits from the edit state on top of the unrefined mask from the modified selection state) so that the image portion 306 is included within the boundaries of the refined image mask. The image editing application 106 can receive a transparency-increasing input (e.g., a movement of the "transparency" slider) that causes the image editing application 106 to increase the degree of transparency for image portions of the target image outside the updated image mask (e.g., by "fading out" the selected portions of the target image 302). This results in the preview interface depicted in FIG. 9, where the preview image 902 is displayed with the image portions 304 and 306 and where other portions of the target image 302 are masked from view.

In some embodiments, a matting operation performed by the image editing application 106 involves constructing a quadmap that identifies important information of a selection. For example, if the image editing application 106 accesses an existing image selection identified in the selection state, and modifications are to be performed on a certain area of the selection, certain areas of the selection should be preserved. An existing selection could be described using a trimap. The trimap includes a first set of pixels corresponding to certain pixels in the target image, where the first pixels have a first color (e.g., a "black" color such as a zero grayscale value) that identifies a background portion of the target image. The trimap also includes a second set of pixels corresponding to other, selected pixels in the target image, where the second pixels have a second color (e.g., a "white" color such as a grayscale value of 255) that identifies a foreground portion of the target image. The trimap also includes a third set of pixels corresponding to other, selected pixels in the target image, where the third pixels have a third color (e.g., a "gray" color such as a grayscale value of 128) that identifies an "unknown" portion of the target image. Matting involves determining alpha values indicating which pixels from the "unknown" portion of the target image should be assigned to the foreground or the background.

In embodiments involving a quadmap, similar colors are used to indicate the foreground, background, and "unknown" region of the target image. To support preserving the original gray pixels while refining other newly added pixels (i.e., pixels identified via a modified selection), the image editing application 106 adds the fourth, "protected" color to the trimap and passes the quadmap to a relevant matting algorithm. The gray pixels in the original mask are neither background, foreground, nor "unknown," and these gray pixels are represented by this fourth color (e.g., a grayscale value of 64 or some other suitable number). A matting algorithm can ignore (i.e., not evaluate) pixels having the fourth color when performing a matting operation on an updated selection. Thus, after the matting algorithm determines alpha values, the image editing application 106 executing the matting algorithm refers to the "protected" values in the quadamp (i.e., the pixels having the fourth color) and restores certain original mask values by replacing pixels having the fourth, "protected" color with pixels having the third, gray color indicating an unknown region.

For example, if an "edit type" change is made (e.g., a brush stroke using a "Refine Edge" tool or an "Edge Radius" operation), then the image editing application 106 generates a quadmap for the matting algorithm. The image editing application 106 stores that quadmap for display to the user. Areas covered by the radius and the brush strokes become the "unknown" portion in the quadmap. Any gray pixels in the original incoming mask not in the unknown portion are in the "protected" portion of the quadmap image.

Thus, in the process 200, the image editing application 106 may receive, prior to modifying a selection state based on a selection input, an existing selection state from which the quadmap is computed. The trimap has three colors identifying a background portion of the target image, a foreground portion of the target image, and an "unknown" portion of the target image. The image editing application 106 represents the existing selection state as a quadmap of the target image, wherein the quadmap has the first color that identifies the background portion, the second color that identifies the foreground portion of the target image, the third color that identifies the unknown portion of the target image, and the fourth color that identifies protected pixels matching the original portion of the existing selection that have gray alpha values. A matting algorithm or other edge refinement operation is applied by the image editing application, which identifies the "unknown" portion in the quadmap and determines the alpha values of the mask in that region, using the image pixels as input information. The image editing application 106 thereby modifies the selection state by creating a "refined" mask based on both the applied edge refinement operation and the identified protected pixels from the quadmap.

In some embodiments, the image editing application 106 modifies the target image 302 using one or more edits received via the mask-based editing interface. In some embodiments, the image editing application 106 modifies the target image 302 by applying one or more edits to an image mask controlling how the target image 302 is displayed, where an image mask portion that corresponds to the selection state is modified. In additional or alternative embodiments, the image editing application 106 modifies the target image 302 by applying one or more edits to a portion of the target image that corresponds to the selection state.

Figure 12:
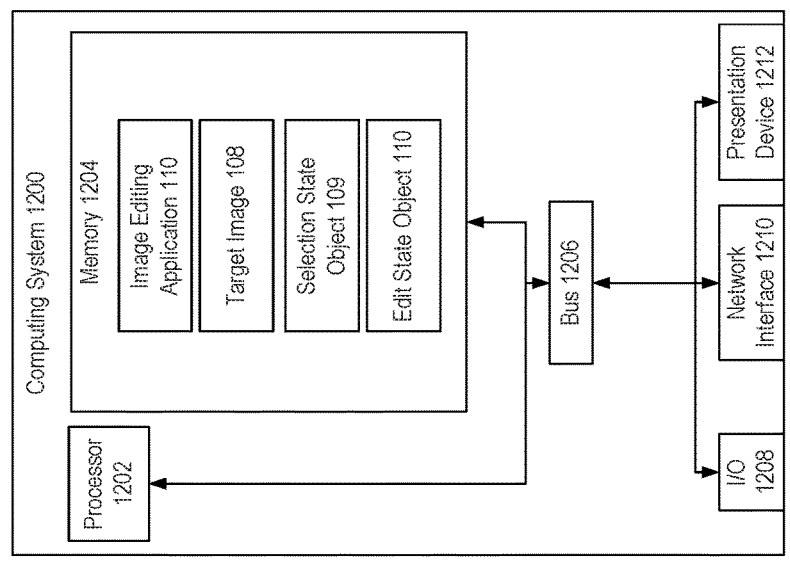
FIG. 12 depicts an example of a computing system that edits dynamically selected portions of target images in a mask-based editing interface of an image editing application, according to certain embodiments of the present disclosure.

Example of a Computing System for Using an Image Editing Application to Edit Dynamically Selected Portions of Target Images Any suitable computing system or group of computing systems can be used for performing the operations described herein. For example, FIG. 12 depicts examples of computing system 1200 that executes an image editing application 106. In some embodiments, the computing system 1200 also executes the image editing application 106, as depicted in FIG. 12. In other embodiments, a separate computing system having devices similar to those depicted in FIG. 12 (e.g., a processor, a memory, etc.) executes the image editing application 106.

The depicted examples of a computing system 1200 includes a processor 1202 communicatively coupled to one or more memory devices 1204. The processor 1202 executes computer-executable program code stored in a memory device 1204, accesses information stored in the memory device 1204, or both. Examples of the processor 1202 include a microprocessor, an application-specific integrated circuit ("ASIC"), a field-programmable gate array ("FPGA"), or any other suitable processing device. The processor 1202 can include any number of processing devices, including a single processing device.

The memory device 1204 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 1200 may also include a number of external or internal devices, such as input or output devices. For example, the computing system 1200 is shown with one or more input/output ("I/O") interfaces 808. An I/O interface 1208 can receive input from input devices or provide output to output devices. One or more buses 1206 are also included in the computing system 1200. The bus 1206 communicatively couples one or more components of a respective one of the computing system 1200.

The computing system 1200 executes program code that configures the processor 1202 to perform one or more of the operations described herein. The program code includes, for example, the image editing application 106 or other suitable applications that perform one or more operations described herein. The program code may be resident in the memory device 1204 or any suitable computer-readable medium and may be executed by the processor 1202 or any other suitable processor. In some embodiments, both the image editing application 106 is stored in the memory device 1204, as depicted in FIG. 12. In additional or alternative embodiments, one or more of the image editing application 106 is stored in different memory devices of different computing systems. In additional or alternative embodiments, the program code described above is stored in one or more other memory devices accessible via a data network.

The computing system 1200 can access various data objects and data structures, such as a target image 108, a selection state object 109, and an edit state object 110. These data objects and data structures, the use of which is described above with respect to FIGS. 1-11, can be accessed in any suitable manner. In some embodiments, some or all of these data objects and data structures are stored in the memory device 1204, as in the example depicted in FIG. 12. For example, a computing system 1200 that executes the image editing application 106 can provide access to a target image 108, a selection state object 109, and an edit state object 110 by external systems that execute the image editing application 106.

In additional or alternative embodiments, some or all of these data objects and data structures are stored in the same memory device (e.g., one of the memory device 1204). For example, a common computing system, such as the creative apparatus 105 depicted in FIG. 1, can host the image editing application 106 and store one or more target images 108, one or more selection state objects 109, and one or more edit state objects 110. In additional or alternative embodiments, some or all of these data objects and data structures are stored in one or more other memory devices accessible via a data network.

The computing system 1200 also includes a network interface device 1210. The network interface device 1210 includes any device or group of devices suitable for establishing a wired or wireless data connection to one or more data networks. Non-limiting examples of the network interface device 1210 include an Ethernet network adapter, a modem, and/or the like. The computing system 1200 is able to communicate with one or more other computing devices (e.g., a computing device executing an image editing application 106) via a data network using the network interface device 1210.

In some embodiments, the computing system 1200 also includes the presentation device 1212 depicted in FIG. 12. A presentation device 1212 can include any device or group of devices suitable for providing visual, auditory, or other suitable sensory output. Non-limiting examples of the presentation device 1212 include a touchscreen, a monitor, a speaker, a separate mobile computing device, etc. In some aspects, the presentation device 1212 can include a remote client-computing device that communicates with the computing system 1200 using one or more data networks described herein. Other aspects can omit the presentation device 1212.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method for using an image editing application to edit dynamically selected portions of target images, wherein the method includes the image editing application performing one or more operations comprising:
   receiving, by the image editing application, a selection state that (i) identifies a portion of a target image for display as a preview image in a mask-based editing interface and (ii) is described with a trimap of the target image, wherein the trimap includes trimap pixel sets respectively having (i) a first color identifying a foreground portion of the target image that is included in the preview image, (ii) a second color identifying a background portion of the target image, and (iii) a third color identifying trimap pixels as having an unknown class
   storing, by the image editing application, the selection state in a quadmap of the target image, wherein the quadmap includes quadmap pixel sets respectively having the first color, the second color, the third color, and a fourth color that identifies quadmap pixels as protected pixels;
   applying, by the image editing application, an edge refinement operation that modifies a portion of the target image that includes pixels identified in the quadmap as having the unknown class;
   modifying, based on a selection input received via the mask-based editing interface, the selection state by creating a mask from both the applied edge refinement operation and pixels identified in the quadmap as the protected pixels, wherein the image editing application concurrently maintains (i) the selection state and
   (ii) an edit state for the preview image that tracks an application of the edge refinement operation; and
   updating the preview image in the mask-based editing interface by rendering, as transparent, content from the target image that is outside a boundary of the mask.

2. The method of claim 1, wherein applying the edge refinement operation comprises:
   receiving an edit command comprising a start input, a movement input subsequent to the start input, and a completion input subsequent to the movement input; and
   updating a display of the preview image to include the edge refinement operation during the movement input.

3. The method of claim 2, the operations further comprising:
   generating the preview image by creating a lower-resolution version of a selected first image portion for use as the preview image; and
   updating the display of the preview image by editing and displaying the lower-resolution version concurrently with the movement input.

4. The method of claim 1, the operations further comprising:
   updating the edit state to track an edit applied to the preview image by modifying the edit state to include (i) an edit type for the edit and (ii) a radius around an image mask associated with the preview image, wherein the radius indicates an applicable area for the edit;
   determining that a selected image portion is within the applicable area; and
   modifying the selected image portion in the preview image in accordance with the edit type.

5. The method of claim 1, wherein the selection state identifies a first image portion of the target image as the preview image by specifying an image mask encompassing the first image portion, wherein the image mask causes selected portions of the target image within the image mask to be visible in the mask-based editing interface and causes other portions of the target image outside the image mask to be transparent in the mask-based editing interface, wherein the method further comprises:
   decreasing, by the image editing application and responsive to a transparency-reducing input, a degree of transparency for the other portions of the target image outside the image mask, wherein the other portions include a second image portion and wherein decreasing the degree of transparency causes the second image portion to be visible in the mask-based editing interface,
   receiving, by the image editing application and while the decreased degree of transparency is present, an additional selection input that causes the second image portion to be included in the preview image;
   updating the image mask so that the second image portion is within the image mask; and
   increasing, by the image editing application and responsive to a transparency-increasing input, the degree of transparency for image portions of the target image outside the updated image mask.

6. The method of claim 1, the operations further comprising modifying the target image by applying an edit to a portion of the target image that corresponds to the selection state or to an image mask controlling how the target image is displayed.

7. A system comprising:
   a processing device; and
   a non-transitory computer-readable medium communicatively coupled to the processing device, wherein the processing device is configured to execute an image editing application stored in the non-transitory computer-readable medium and thereby perform operations comprising:
   receiving a selection state that (i) identifies a portion of a target image for display as a preview image in a mask-based editing interface and (ii) is described with a trimap of the target image, wherein the trimap includes trimap pixel sets respectively having (i) a first color identifying a foreground portion of the target image that is included in the preview image, (ii) a second color identifying a background portion of the target image, and (iii) a third color identifying trimap pixels as having an unknown class,
   storing the selection state in a quadmap of the target image, wherein the quadmap includes quadmap pixel sets respectively having the first color, the second color, the third color, and a fourth color that identifies quadmap pixels as protected pixels,
   applying an edge refinement operation that modifies a portion of the target image that includes pixels identified in the quadmap as having the unknown class, modifying, based on a selection input received via the mask-based editing interface, the selection state by creating a mask from both the applied edge refinement operation and pixels identified in the quadmap as the protected pixels, wherein the image editing application is configured for concurrently maintaining (i) the selection state and (ii) an edit state for the preview image that tracks an application of the edge refinement operation, and updating the preview image in the mask-based editing interface by rendering, as transparent, content from the target image that is outside a boundary of the mask.

8. The system of claim 7, wherein applying the edge refinement operation comprises:

receiving an edit command comprising a start input, a movement input subsequent to the start input, and a completion input subsequent to the movement input; and updating a display of the preview image to include the edge refinement operation during the movement input.

9. The system of claim 8, the operations further comprising:

generating the preview image by creating a lower-resolution version of a selected first image portion for use as the preview image; and updating the display of the preview image by editing and displaying the lower-resolution version concurrently with the movement input.

10. The system of claim 7, the operations further comprising:

updating the edit state to track an edit applied to the preview image by modifying the edit state to include (i) an edit type for the edit and (ii) a radius around an image mask associated with the preview image, wherein the radius indicates an applicable area for the edit;

determining that a selected image portion is within the applicable area; and modifying the selected image portion in the preview image in accordance with the edit type.

11. The system of claim 7, wherein the selection state identifies a first image portion of the target image as the preview image by specifying an image mask encompassing the first image portion, wherein the image mask causes selected portions of the target image within the image mask to be visible in the mask-based editing interface and causes other portions of the target image outside the image mask to be transparent in the mask-based editing interface, wherein the operations further comprise:

decreasing, responsive to a transparency-reducing input, a degree of transparency for the other portions of the target image outside the image mask, wherein the other portions include a second image portion and wherein decreasing the degree of transparency causes the second image portion to be visible in the mask-based editing interface, receiving, while the decreased degree of transparency is present, an additional selection input that causes the second image portion to be included in the preview image;

updating the image mask so that the second image portion is within the image mask; and increasing, responsive to a transparency-increasing input, the degree of transparency for image portions of the target image outside the updated image mask.

12. The system of claim 7, the operations further comprising modifying the target image by applying an edit to a portion of the target image that corresponds to the selection state or to an image mask controlling how the target image is displayed.

13. A non-transitory computer-readable medium storing program code of an image editing application that is executable by a processing device to perform operations, the operations comprising:

receiving a selection state that (i) identifies a portion of a target image for display as a preview image in a mask-based editing interface and (ii) is described with a trimap of the target image, wherein the trimap includes trimap pixel sets respectively having (i) a first color identifying a foreground portion of the target image that is included in the preview image, (ii) a second color identifying a background portion of the target image, and (iii) a third color identifying trimap pixels as having an unknown class;

storing the selection state in a quadmap of the target image, wherein the quadmap includes quadmap pixel sets respectively having the first color, the second color, the third color, and a fourth color that identifies quadmap pixels as protected pixels;

applying an edge refinement operation that modifies a portion of the target image that includes pixels identified in the quadmap as having the unknown class;

modifying, based on a selection input received via the mask-based editing interface, the selection state by creating a mask from both the applied edge refinement operation and pixels identified in the quadmap as the protected pixels, wherein the image editing application concurrently maintains (i) the selection state and (ii) an edit state for the preview image that tracks an application of the edge refinement operation; and updating the preview image in the mask-based editing interface by rendering, as transparent, content from the target image that is outside a boundary of the mask.

14. The non-transitory computer-readable medium of claim 13, wherein applying the edge refinement operation comprises:

receiving an edit command comprising a start input, a movement input subsequent to the start input, and a completion input subsequent to the movement input; and updating a display of the preview image to include the edge refinement operation during the movement input.

15. The non-transitory computer-readable medium of claim 14, the operations further:

generating the preview image by creating a lower-resolution version of a selected first image portion for use as the preview image; and updating the display of the preview image by editing and displaying the lower-resolution version concurrently with the movement input.

16. The non-transitory computer-readable medium of claim 13, further comprising:

updating the edit state to track an edit applied to the preview image by modifying the edit state to include (i) an edit type for the edit and (ii) a radius around an image mask associated with the preview image, wherein the radius indicates an applicable area for the edit;

determining that a selected image portion is within the applicable area; and modifying the selected image portion in the preview image in accordance with the edit type.

17. The non-transitory computer-readable medium of claim 13, wherein the selection state identifies a first image portion of the target image as the preview image by specifying an image mask encompassing the first image portion, wherein the image mask causes selected portions of the target image within the image mask to be visible in the mask-based editing interface and causes other portions of the target image outside the image mask to be transparent in the mask-based editing interface, wherein the operations further comprise:
- decreasing, responsive to a transparency-reducing input, a degree of transparency for the other portions of the target image outside the image mask, wherein the other portions include a second image portion and wherein decreasing the degree of transparency causes the second image portion to be visible in the mask-based editing interface,
- receiving, while the decreased degree of transparency is present, an additional selection input that causes the second image portion to be included in the preview image;
- updating the image mask so that the second image portion is within the image mask; and
- increasing, responsive to a transparency-increasing input, the degree of transparency for image portions of the target image outside the updated image mask.

18. The non-transitory computer-readable medium of claim 13, the operations further comprising modifying the target image by applying an edit to a portion of the target image that corresponds to the selection state or to an image mask controlling how the target image is displayed.

* * * * *